United States Patent
Chen et al.

(10) Patent No.: US 7,905,601 B2
(45) Date of Patent: Mar. 15, 2011

(54) COLOR FILTERING DEVICE

(75) Inventors: Mei-Ling Chen, Hsinchu (TW); S-Wei Chen, Hsinchu (TW); Chao-Shun Chen, Hsinchu (TW); Hung-Cheng Lung, Hsinchu (TW); Chun-Fa Hsu, Hsinchu (TW); Cheng-Shun Liao, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 726 days.

(21) Appl. No.: 11/858,603

(22) Filed: Sep. 20, 2007

(65) Prior Publication Data

US 2008/0304015 A1 Dec. 11, 2008

(30) Foreign Application Priority Data

Jun. 11, 2007 (TW) ................................ 96209560 U

(51) Int. Cl.
G03B 21/14 (2006.01)
(52) U.S. Cl. ........................................... 353/20; 353/84
(58) Field of Classification Search .................. 353/20, 353/84; 359/496–502
See application file for complete search history.

(56) References Cited

U.S. PATENT DOCUMENTS

| | | | |
|---|---|---|---|
| 6,199,987 B1 * | 3/2001 | Haba et al. | 353/34 |
| 6,933,591 B1 | 8/2005 | Sidhu et al. | |
| 7,224,633 B1 | 5/2007 | Hovis et al. | |
| 2004/0057021 A1 * | 3/2004 | Lassar et al. | 353/84 |
| 2004/0236967 A1 | 11/2004 | Korcharz et al. | |
| 2005/0237487 A1 * | 10/2005 | Chang | 353/7 |

* cited by examiner

Primary Examiner — Georgia Y Epps
Assistant Examiner — Jerry Brooks
(74) Attorney, Agent, or Firm — J.C. Patents

(57) ABSTRACT

A color filtering device including a color filter, a plurality of polarization beam splitting units, a plurality of reflecting units, and a plurality of wave plates is provided. The color filter has a plurality of filtering parts and a plurality of light shielding parts alternately arranged thereon. Each of the polarization beam splitting units is disposed in front of one of the filtering parts and makes an angle with a corresponding filtering part. Each of the reflecting units is disposed in front of one of the light shielding parts and makes an angle with a corresponding light shielding part. Each of the wave plates is substantially parallel to one of the filtering parts. Each of the polarization beam splitting units is disposed between a pair of a wave plate and a filtering part. The color filtering device has both color filtering function and polarization conversion function.

19 Claims, 9 Drawing Sheets

COLOR FILTERING DEVICE

CROSS-REFERENCE TO RELATED APPLICATION

This application claims the priority benefit of Taiwan application serial no. 96209560, filed on Jun. 11, 2007. All disclosure of the Taiwan application is incorporated herein by reference.

BACKGROUND OF THE INVENTION

1. Field of the Invention

The present invention relates to a color filtering device and a display apparatus using the same. More particularly, the present invention relates to a color filtering device having both color filtering function and polarization conversion function and a projection apparatus using the same.

2. Description of Related Art

FIG. 1A is a schematic structural view of a conventional projection apparatus. Referring to FIG. 1A, a conventional projection apparatus 100 includes an illumination system 110, a liquid crystal on silicon panel (LCOS panel) 120, and an imaging system 130. The illumination system 110 includes a lamp module 112, a light integration rod 114, a color wheel 116 and a polarization conversion system (PCS) 118. The lamp module 112 emits an illumination beam 113. The illumination beam 113 passes through the light integration rod 114, the color wheel 116, the PCS 118 in sequence and travels to the LCOS panel 120. The LCOS panel 120 converts the illumination beam 113 into an image beam 113' and makes it project to the imaging system 130. The imaging system 130 includes a plurality of lenses 132, and the imaging system 130 projects the image beam 113' onto a screen (not shown).

FIG. 1B shows spots formed by the illumination beam projected onto the PCS and a cross-section of the PCS in FIG. 1A from top to bottom. Referring to FIGS. 1A and 1B, the PCS 118 has a light incident surface 118a and a light emitting surface 118b. The light incident surface 118a has a plurality of transparent regions 119a and a plurality of light shielding regions 119b which are alternately arranged. Since light rays incident on different positions of the light integration rod 114 with different angles are reflected different times in the light integration rod 114, the illumination beam 113 projects a plurality of spots 113a at different positions on the light incident surface 118a of the PCS 118. Additionally, since the positions of the spots 113a on the light incident surface 118a is related to the angles and positions of the light rays incident on the light integration rod 114, the spots 113a are not arranged at equal intervals.

However, as the widths of the transparent regions 119a and the light shielding regions 119b of the PCS 118 are generally the same, parts of the spots 113a fall in the light shielding regions 119b and cannot be utilized by the projection apparatus 100 to project the display image, thus resulting in a loss of brightness of the display image approaching 15-20%. Furthermore, as a position tolerance of a lampwick 112a of the lamp module 112 is generated during manufacturing or assembly, the spots 113a cannot be accurately focused on the transparent regions 119a, and parts of the spots 113a fall on the light shielding regions 119b, which results in a loss of brightness of the display image.

Referring to FIGS. 1A and 1C, symbol 113b in FIG. 1C represents spots formed by the illumination beam 113 projected on the color wheel 116. As the color wheel 116 is composed of a plurality of filtering parts 116a with different colors, and in a period from Time T1 at which a juncture 116b of two neighboring filtering parts 116a passes by the left end of a horizontal line 113b' of the spot 113b to Time T2 at which the juncture 116b passes by the right end of the horizontal line 113b', the horizontal line 113b' falls on the filtering parts 116a with two different colors at the same time, light with two different colors are generated. Accordingly, in the period from Time T1 to Time T2, the LCOS panel 120 does not perform image processing, which results in the decrease of brightness of the display image. Referring to FIG. 1D, similarly, the same problem also occurs in a period from Time T3 at which the juncture 116b passes by the right end of a horizontal line 113b" of the spot 113b to Time T4 at which the juncture 116b passes by the left end of the horizontal line 113b".

Another conventional projection apparatus uses two fly eyes to replace the above light integration rod 114 to provide a light uniform function. However, an alignment tolerance is generated when the two fly eyes is assembled, so the spots formed by the illumination beam imaged on the PCS cannot be accurately focused on the transparent regions after the illumination light passes through the fly eyes, which also results in the loss of brightness of the display image.

SUMMARY OF THE INVENTION

Accordingly, the present invention is directed to a color filtering device, which has both color filtering function and polarization conversion function, and a projection apparatus using the color filtering device projects display images with higher brightness.

Other advantages of the present invention can be further apparent from the technical features disclosed in the present invention. As embodied and broadly described herein, a color filtering device including a color filter, a plurality of polarization beam splitting units, a plurality of reflecting units and a plurality of wave plates is provided in an embodiment of the present invention. The color filter has a plurality of filtering parts and a plurality of light shielding parts. The filtering parts and the light shielding parts are alternately arranged. The polarization beam splitting units are disposed in front of the filtering parts respectively, and each of the polarization beam splitting units makes an angle with a corresponding filtering part. The reflecting units are respectively disposed in front of the light shielding parts, and each of the reflecting units makes an angle with a corresponding light shielding part. The wave plates are substantially parallel to the filtering parts respectively, and each of the polarization beam splitting units is disposed between a pair of a corresponding wave plate and a corresponding filtering part.

A color filtering device suitable for being used in a projection apparatus is further provided in an embodiment of the present invention. The projection apparatus includes an illumination system and a light valve. The illumination system includes a lamp module, a light integration rod, and the above-mentioned color filtering device. The lamp module is capable of providing an illumination beam. The light integration rod is disposed on a transmission path of the illumination beam and has a light input end and a light output end. The color filter is disposed on the transmission path of the illumination beam and between the light integration rod and the light valve. Furthermore, the color filter is capable of being moved or rotated, so as to make each filtering part face the light output end of the light integration rod in turn. The light valve is disposed on the transmission path of the illumination beam, and the light valve is capable of converting the illumination beam into an image beam.

As the color filtering device integrates the color filter, the polarization beam splitting units, the reflecting units and the wave plates, the color filtering device has both color filtering function and polarization conversion function. Moreover, in the projection apparatus, since one of the filtering parts is moved to a position right facing the light output end of the light integration rod at a moment, the proportion of the illumination beam passing through the color filtering device is greatly increased. In this manner, the brightness of the display image projected by the projection apparatus is effectively improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 2A:
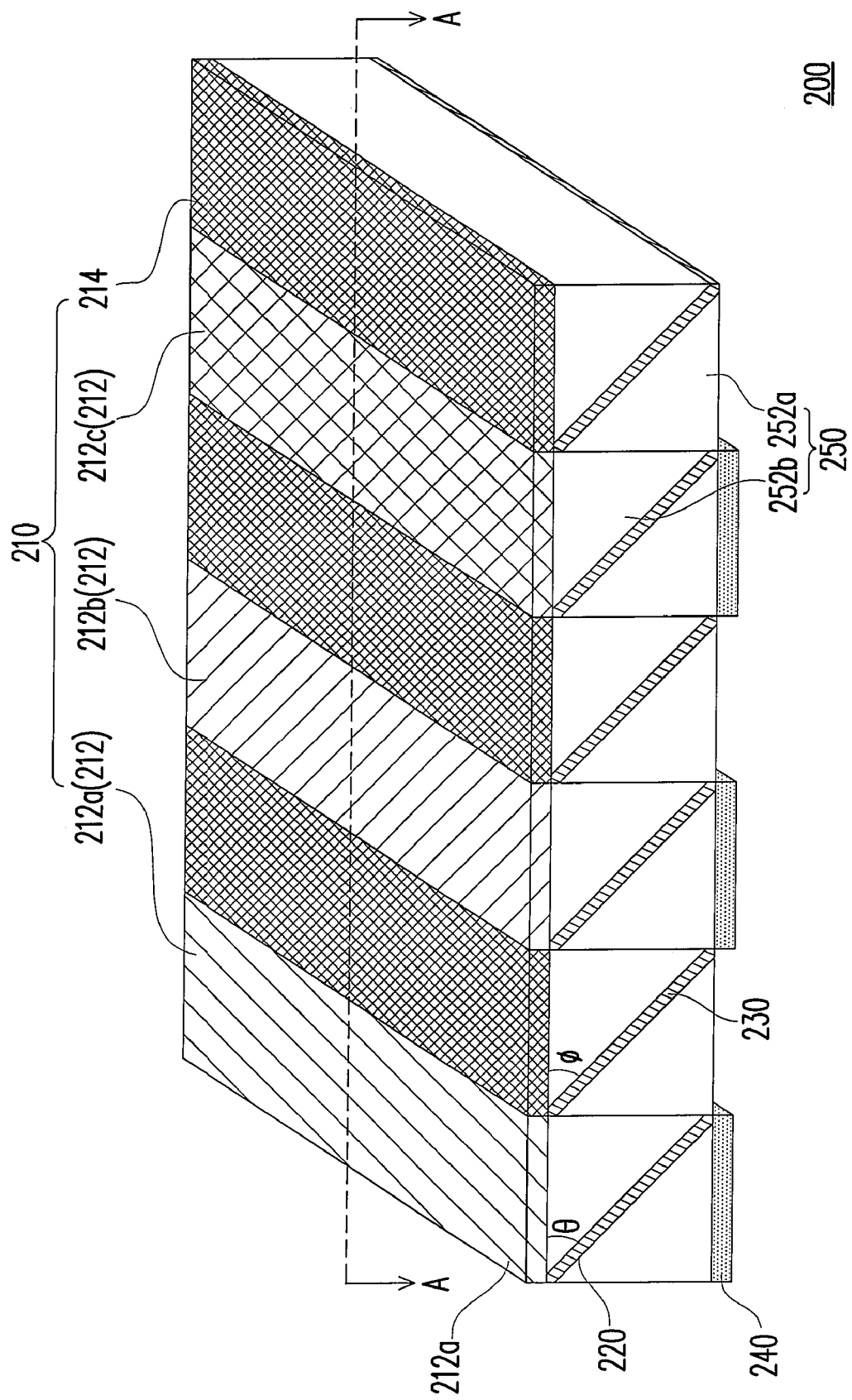
FIG. 2A is a perspective view of a color filtering device according to an embodiment of the present invention.
Figure 2B:
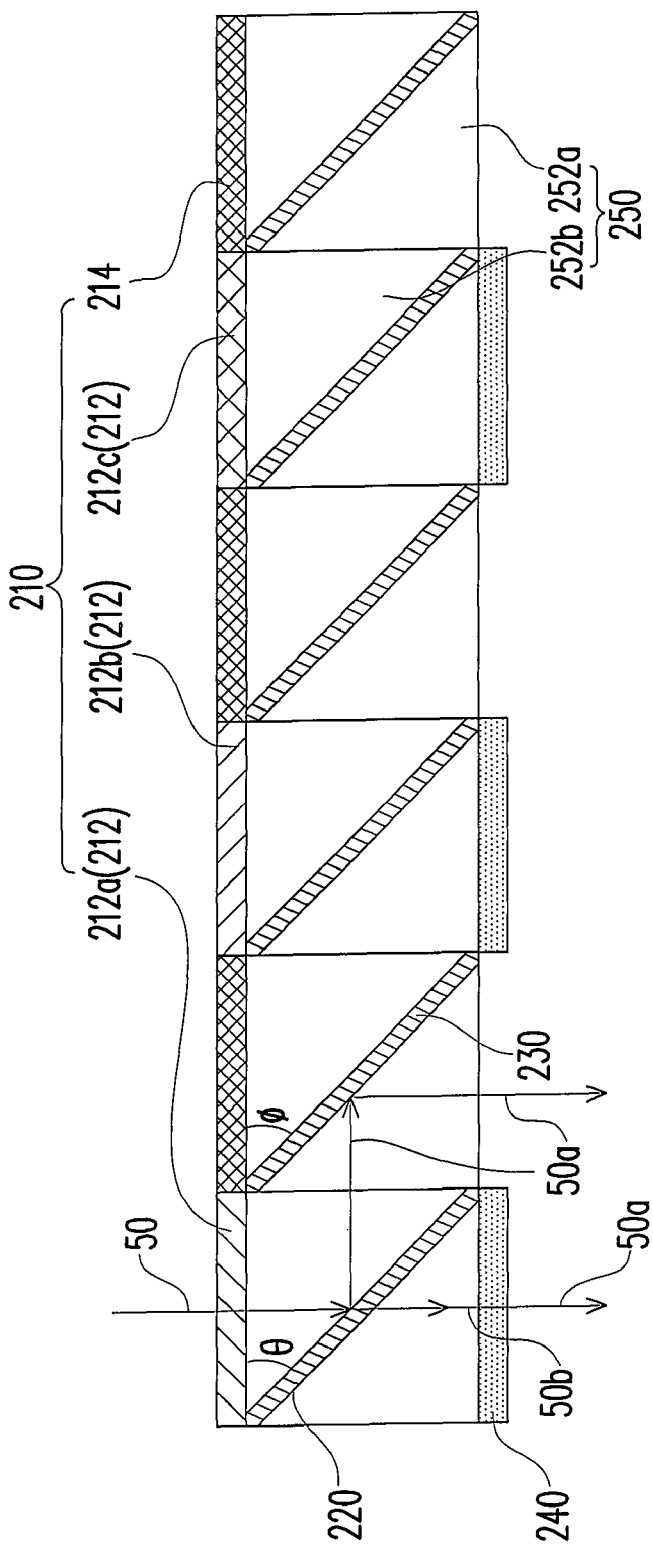
FIG. 2B is a cross-sectional view of the color filtering device in FIG. 2A taken along line A-A.

Referring to FIGS. 2A and 2B, a color filtering device 200 according to an embodiment of the present invention includes a color filter 210, a plurality of polarization beam splitting units 220, a plurality of reflecting units 230 and a plurality of wave plates 240. The color filter 210 has a plurality of filtering parts 212 and a plurality of light shielding parts 214. The filtering parts 212 and the light shielding parts 214 are alternately arranged. Each of the polarization beam splitting units 220 is disposed in front of the filtering parts 212 respectively, and each of the polarization beam splitting units 220 makes an angle $\theta$ with a corresponding filtering part 212. Each of the reflecting units 230 is disposed in front of the light shielding parts 214 respectively, and each of the reflecting units 230 makes an angle $\phi$ with a corresponding light shielding part 214. The wave plates 240 are substantially parallel to the filtering parts 212 respectively, and each of the polarization beam splitting units 220 is disposed between a pair of a corresponding wave plate 240 and a corresponding filtering part 212.

Figure 2C:
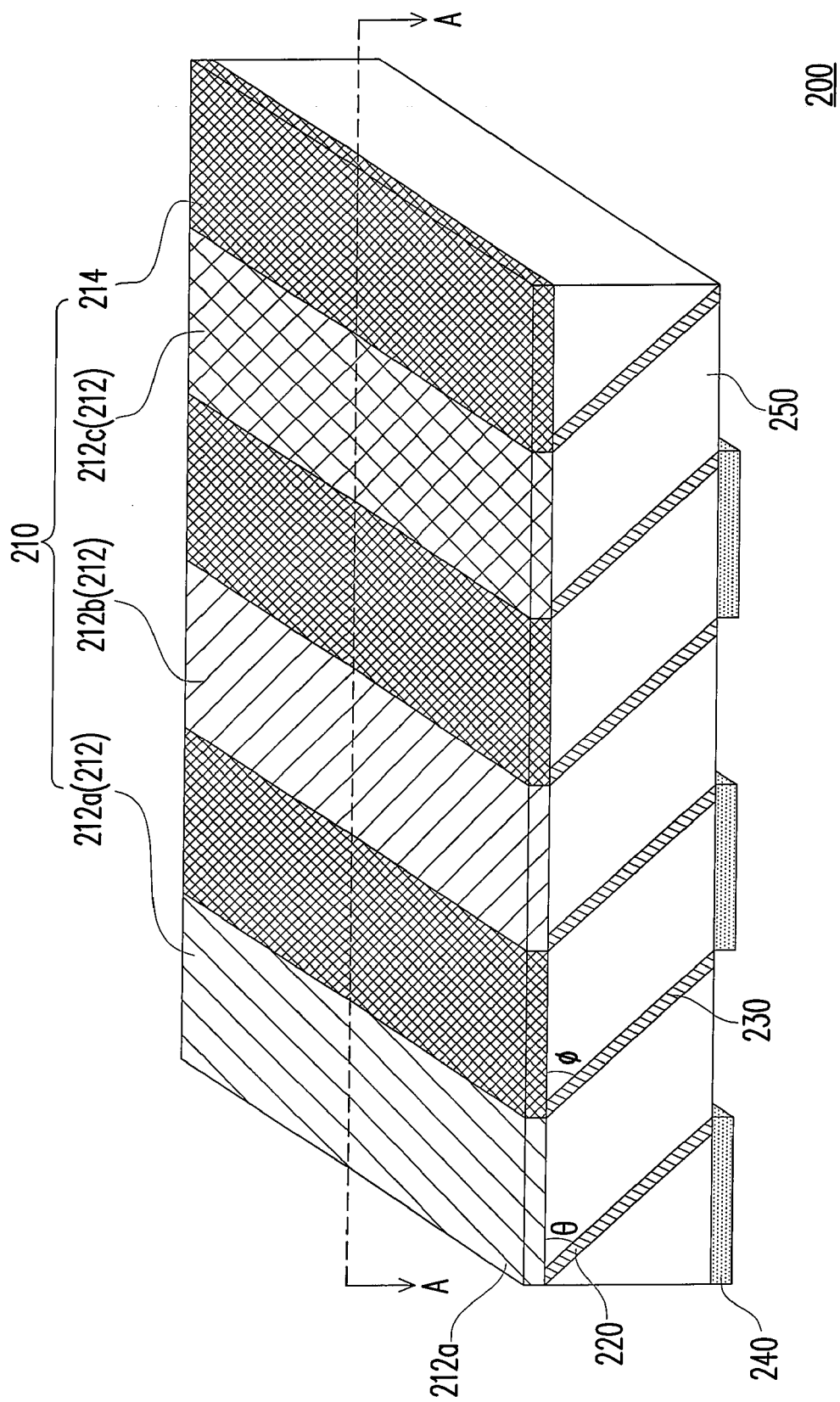
FIG. 2C is another perspective view of a color filtering device according to an embodiment of the present invention.

In this embodiment, the color filtering device 200 further includes a plurality of transparent bodies 250 disposed in front of the filtering parts 212 and the light shielding parts 214. Each of the transparent bodies 250 comprises two triangular prisms 252a and 252b, and a coating is disposed at a juncture of the triangular prism 252a of each transparent body 250 and the triangular prism 252b of a neighboring transparent body 250, so as to form the polarization beam splitting units 220 and the reflecting units 230. Also, as shown in FIG. 2C, a transparent body 250 is made of a transparent material in the shape of a trapezohedron, and a polarization beam splitting film and a reflecting film are respectively coated at the junctures of the transparent body 250 and its neighboring transparent bodies 250. In detail, the coating disposed in front of the filtering parts 212 is the polarization beam splitting film, and the polarization beam splitting units 220 are polarization beam splitting films. The coating disposed in front of the light shielding parts 214 is a reflecting film, and the reflecting units 230 are reflecting films. In other embodiments, the polarization beam splitting units may be polarization beam splitter plates, and the reflecting units may be reflector plates. Under such circumstance, the color filtering device does not need the transparent body.

In this embodiment, the color filter 210 is, for example, rectangular-shaped, and each of the filtering parts 212 and each of the light shielding parts 214 are, for example, also rectangular-shaped. Furthermore, the filtering parts 212 have various colors, and any two neighboring filtering parts 212 have different colors. In details, in this embodiment, the filtering parts 212 are further classified into red filtering parts 212a, green filtering parts 212b, and blue filtering parts 212c according to colors.

As shown in FIG. 2B, the color filtering device 200 in this embodiment has both color filtering function and polarization conversion function. For example, when an un-polarized beam (white beam) 50 is incident on the red filtering part 212a of the color filtering device 200, the unpolarized beam 50 is filtered into a red beam. Next, the un-polarized beam 50 propagates to the polarization beam splitting unit 220. The polarization beam splitting unit 220 divides the unpolarized beam 50 into a first polarized beam 50a and a second polarized beam 50b. The first polarized beam 50a is reflected to the reflecting unit 230 by the polarization beam splitting unit 220, and is then reflected by the reflecting unit 230. Moreover, the second polarized beam 50b passes through the polarization beam splitting units 220 and propagates to the wave plates 240, and the wave plates 240 convert the second polarized beam 50b into a beam with the same polarization direction of the first polarized beam 50a. The first polarized beam 50a passing through the wave plates 240 combines with the first polarized beam 50a reflected by the reflecting units 230. Furthermore, the polarization direction of the first polarized beam 50a is substantially perpendicular to that of the second polarized beam 50b, and the wave plates 240 are, for example, half-wave plates. In detail, the first polarized beam 50a is an S-polarized beam, and the second polarized beam 50b is a P-polarized beam.

In this embodiment, the polarization beam splitting units 220 are substantially parallel to the reflecting units 230 respectively, so as to allow the second polarized beam 50b passing through the polarization beam splitting units 220 and the first polarized beam 50a reflected by the reflecting units 230 to be emitted from the color filtering device 200 substantially in the same direction. Furthermore, the angle θ and the angle φ fall within, for example, 0°-90°, and preferably 45°. In addition, the wave plates 240 are also substantially parallel to the filtering parts 212, for example.

From the above description, the unpolarized beam (white beam) 50 incident on the red filtering parts 212a of the color filtering device 200 is converted into a red beam with a first polarization direction by the color filtering device 200 after passing through the color filtering device 200. Similarly, the unpolarized beam (white beam) 50 incident on the green filtering parts 212b of the color filtering device 200 is converted in to a green beam with the first polarization direction by the color filtering device 200 after passing through the color filtering device 200. The unpolarized beam (white beam) 50 incident on the blue filtering parts 212c of the color filtering device 200 is converted into a blue beam with the first polarization direction by the color filtering device 200 after passing through the color filtering device 200.

The color filtering device 200 in this embodiment has both color filtering function and polarization conversion function. Moreover, the color filtering device 200 replaces the color wheel and the polarization conversion unit in the conventional projection apparatus. That is to say, one element in this embodiment replaces two elements in the conventional art. Therefore, the optical path of a projection apparatus using the color filtering device 200 is reduced, thereby reducing the volume of the projection apparatus.

It should be noted that the color filter 210 is not limited to be rectangular-shaped, and the color filtering device 200 is not limited to be cuboid in the present invention. In other embodiments of the present invention, the color filter and the color filtering device can also be in other suitable shapes. For example, in a color filtering device 200' according to another embodiment of the present invention, referring to FIG. 3, a color filter 210' is round, and each of the filtering parts 212' and each of the light shielding parts 214' are sector-shaped. Further, the polarization beam splitting units 220', reflecting units 230', transparent bodies 250', and wave plates 240' are also in the shape corresponding to that of the filtering parts 212' or the light shielding parts 214', so that the color filtering device 200' is in the shape of disk.

Figure 4:
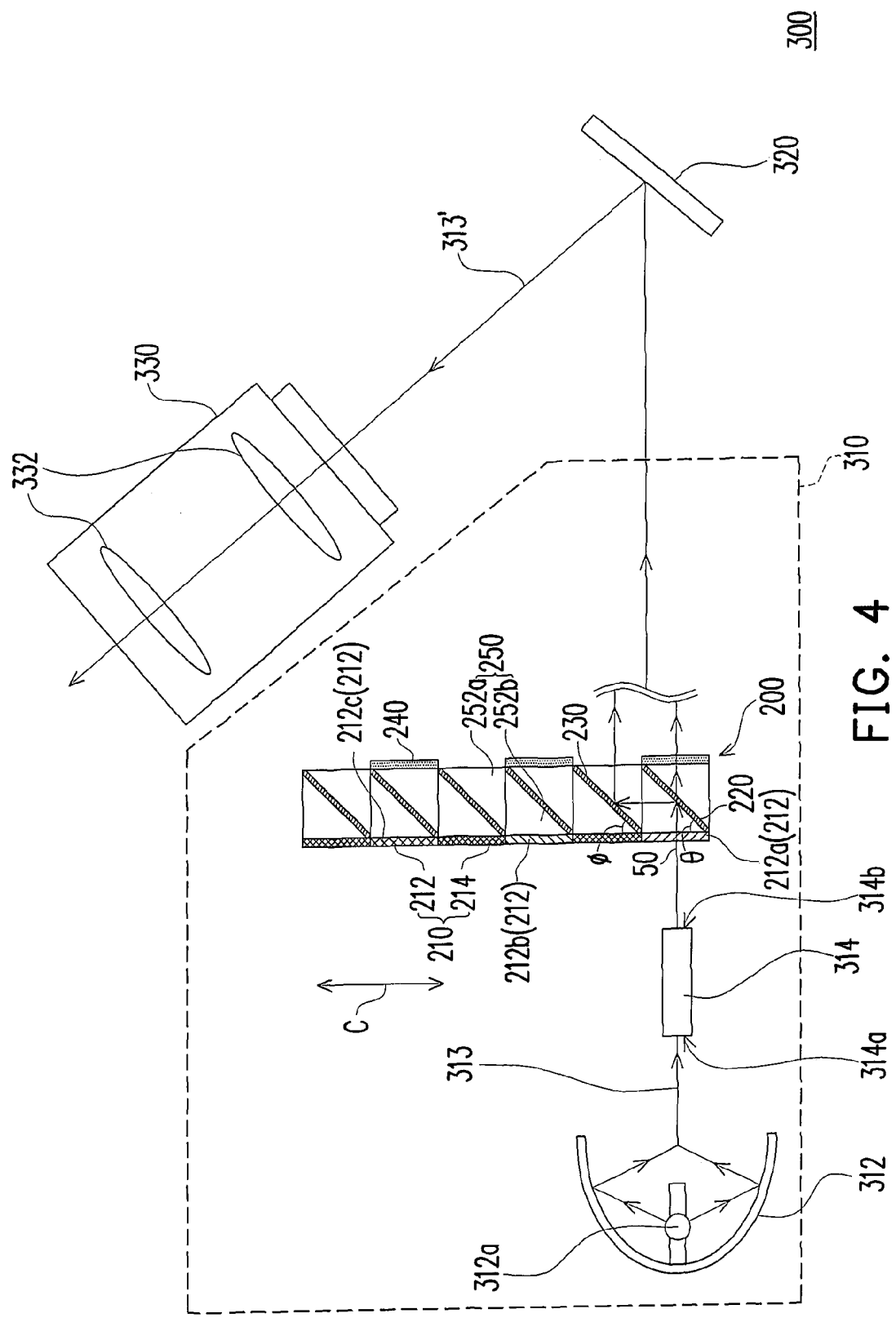
FIG. 4 is a schematic structural view of a projection apparatus according to an embodiment of the present invention.

Referring to FIG. 4, a projection apparatus 300 according to an embodiment of the present invention includes an illumination system 310, a light valve 320 and an imaging system 330. The illumination system 310 includes a lamp module 312, a light integration rod 314 and the above color filtering device 200. The lamp module 312 is capable of providing an illumination beam 313. The light integration rod 314 is disposed on the transmission path of the illumination beam 313 and has a light input end 314a and a light output end 314b. The color filtering device 200 is disposed on the transmission path of the illumination beam 313 and is disposed at the position facing the light output end 314b. Moreover, the color filtering device 200 is, for example, electrically connected to an actuator (not shown). The actuator is capable of making the color filtering device 200 move to-and-fro in a direction C, so as to make one of the red filtering parts 212a, the green filtering parts 212b and the blue filtering parts 212c facing the light output end 314b. The light valve 320 is disposed on the transmission path of the illumination beam 313, and the color filtering device 200 is disposed between the light integration rod 314 and the light valve 320. The light valve 320 is, for example, the LCOS panel, which is capable of converting the illumination beam 313 into an image beam 313'. The imaging system 330 is disposed on the transmission path of the image beam 313'. In this embodiment, the imaging system 330 further includes a plurality of lenses 332, and the imaging system 330 is used to project the image beam 313' onto a screen.

In this embodiment, in each cycle of the to-and-fro movement of the color filtering device 200, the color of the filtering parts 212 facing the light output end 314b is, for example, red, green, blue, blue, green and red in sequence. In detail, each cycle includes two frame times, the display image in the first frame time is formed by overlapping the red, green and blue image beams 313', and the display image in the second frame time is formed by overlapping the blue, green and red image beams 313'.

As the light output end 314b merely faces one of the filtering parts 212 at a time, most of the illumination beam 313 output from the light output end 314b enters the color filtering device 200 through said one of the filtering parts 212. Furthermore, the light valve 320 performs the on/off switch on the liquid crystal when the illumination beam 313 is incident on the light shielding parts 214 by means of the match between the frequencies of the actuator and light valve 320, which effectively utilizes time intervals. Compared with conventional projection apparatus in which a larger proportion of the illumination beam is blocked by the light shielding region of the PCS, the projection apparatus 300 of this embodiment has higher light utilization efficiency, so it projects display images with higher brightness.

In this embodiment, in order to ensure that all light rays of the illumination beam 313 output from the light integration rod 314 can pass through the filtering parts 212 facing the light integration rod 314, the cross-sectional area of the light output end 314b may be designed to be smaller than or equal to the area of each filtering part 212. Additionally, the light output end 314b may be put close to the color filtering device 200 to some suitable extent, so as to ensure that most of the illumination beam 313 can pass through the filtering parts 212 facing the light integration rod 314. In this way, the light utilization efficiency of the projection apparatus 300 is greatly improved. Moreover, the area of the filtering parts 212 may be designed to be somewhat larger than the cross-sectional area of the light output end 314b. As such, the situation that parts of the illumination beam 313 cannot pass through the filtering parts 212 facing the light integration rod 314 due to the assembly tolerance of the lampwick 312a of the lamp module 312 or each element of the projection apparatus 300 can be avoided. In other words, the position error of the projection apparatus 300 as a result of assembly does not influence the brightness of the display image.

Figure 1A:
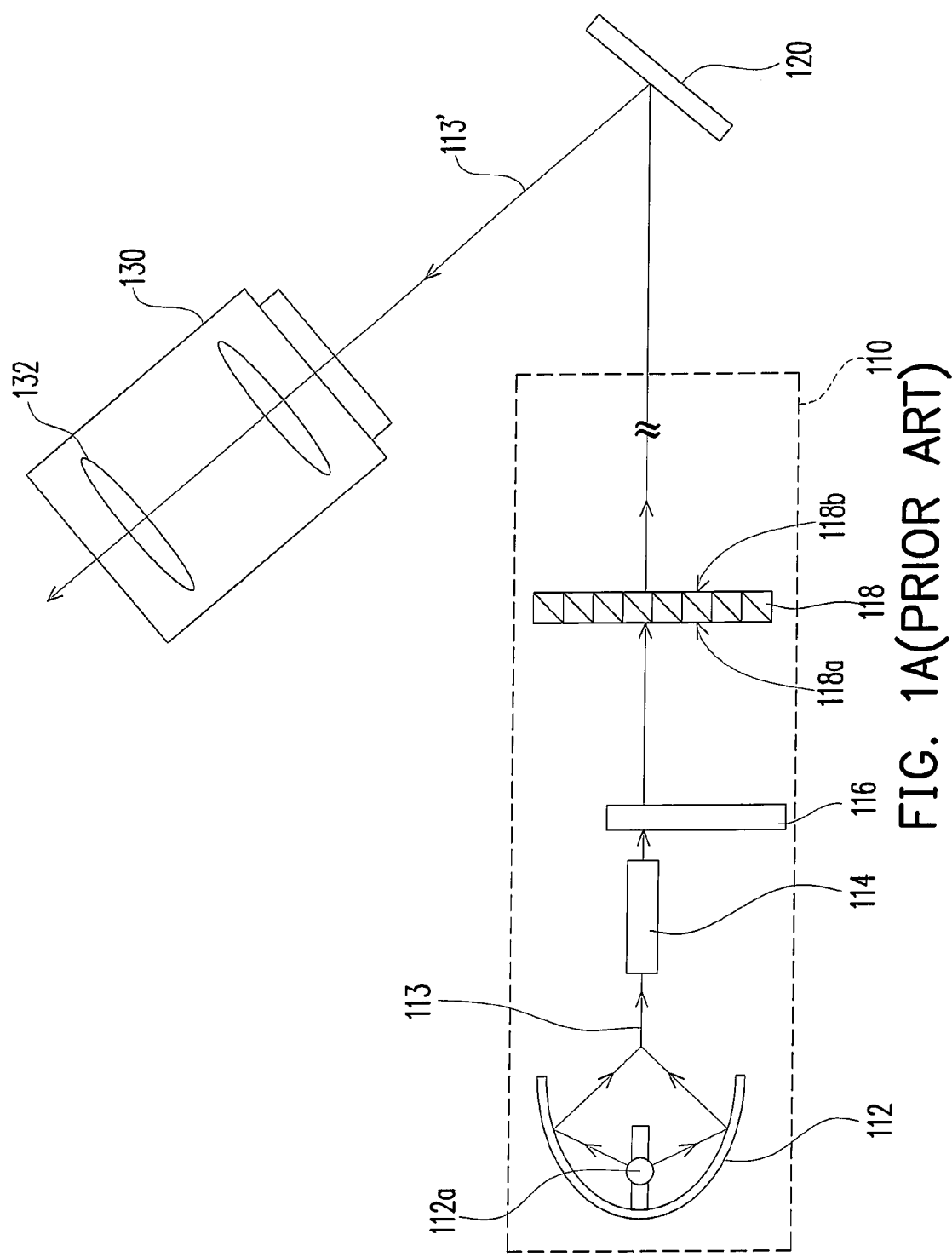
FIG. 1A is a schematic structural view of a conventional projection apparatus.
Figure 1B:
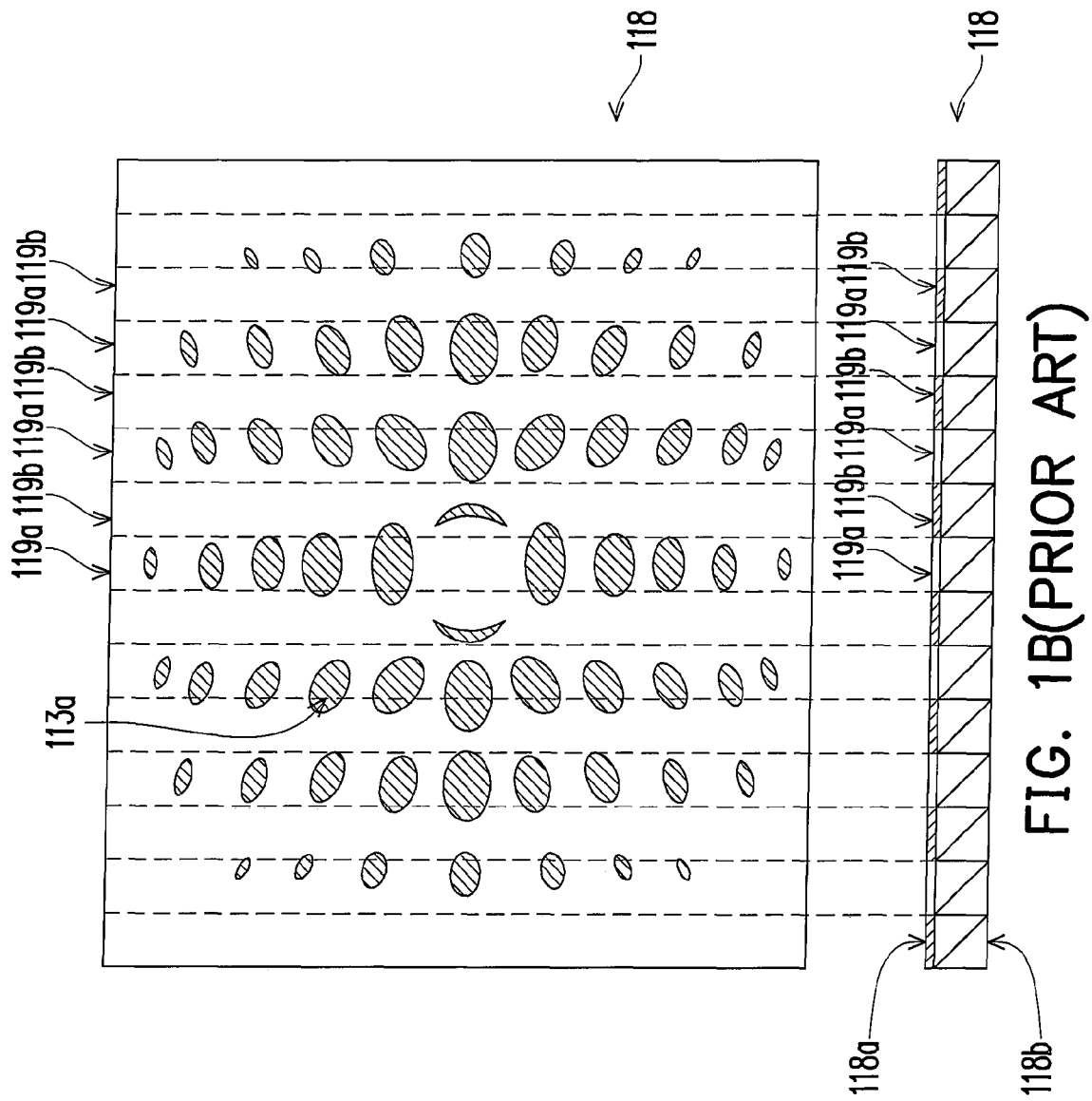
FIG. 1B shows spots formed by the illumination beam projected onto the PCS and a cross-section of the PCS in FIG. 1A from top to bottom.
Figure 1D:
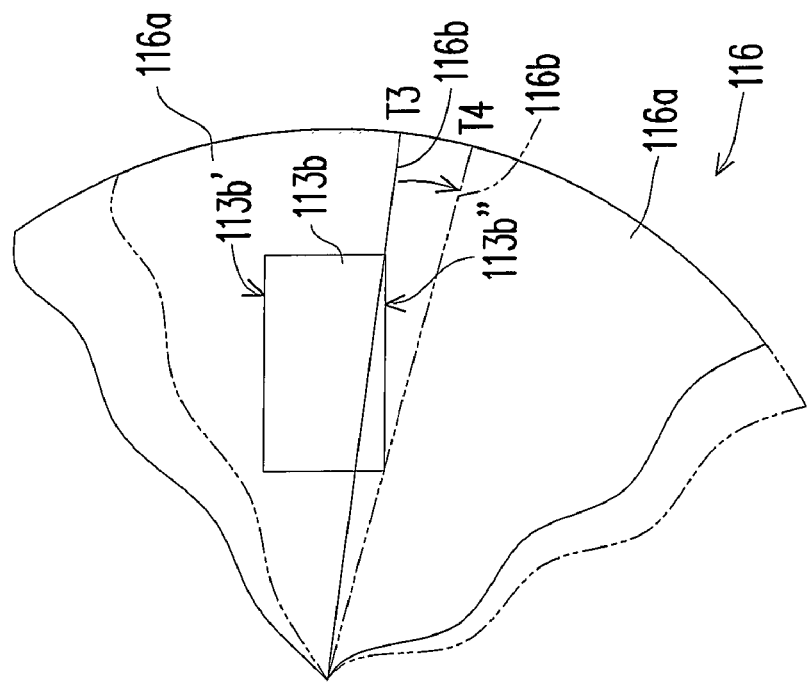
FIGS. 1C and 1D show spots formed by the illumination beam in FIG. 1A projected on a color wheel.
Figure 1C:
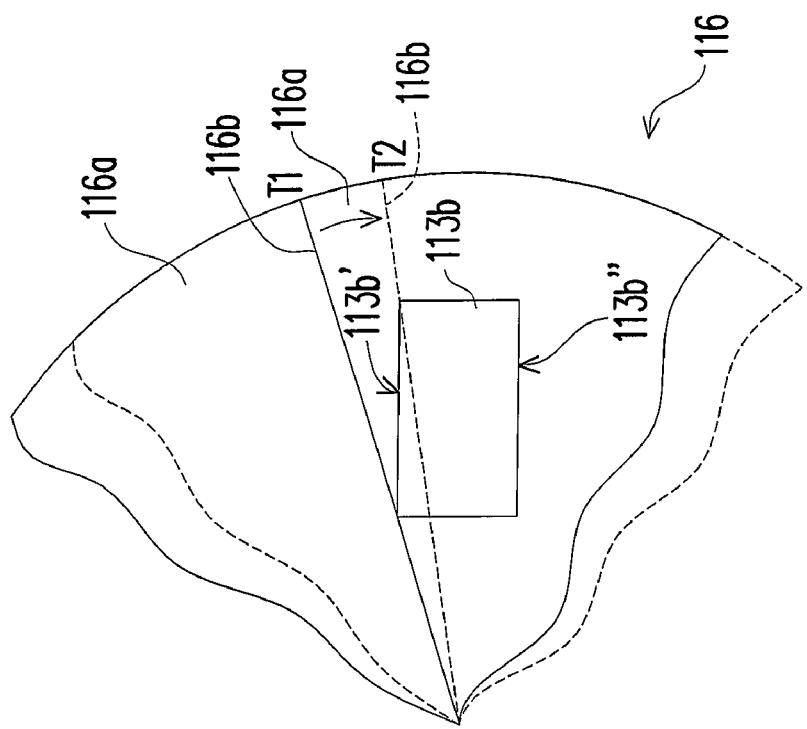

Moreover, in this embodiment, the color filtering device 200 is linearly moved, and the filtering parts 212 is rectangular-shaped rather than sector-shaped, and thus the situation that the light with two different colors are generated in the same horizontal line 113b' in FIG. 1C is avoided. Accordingly, the light valve 320 is unnecessary to be closed in a specific time as that in the conventional art, so the light utilization efficiency of the projection apparatus 300 of this embodiment is improved.

It should be noted that the light valve 320 is not limited to a LCOS panel in the present invention. In other embodiments, the light valve can also be a transmissive liquid crystal panel. Definitely, those of ordinary skills in the art should appreciate that the position of the imaging system 330 should be properly adjusted in the embodiments adopting the transmissive liquid crystal panel, which will not further illustrated with drawings.

Figure 3:
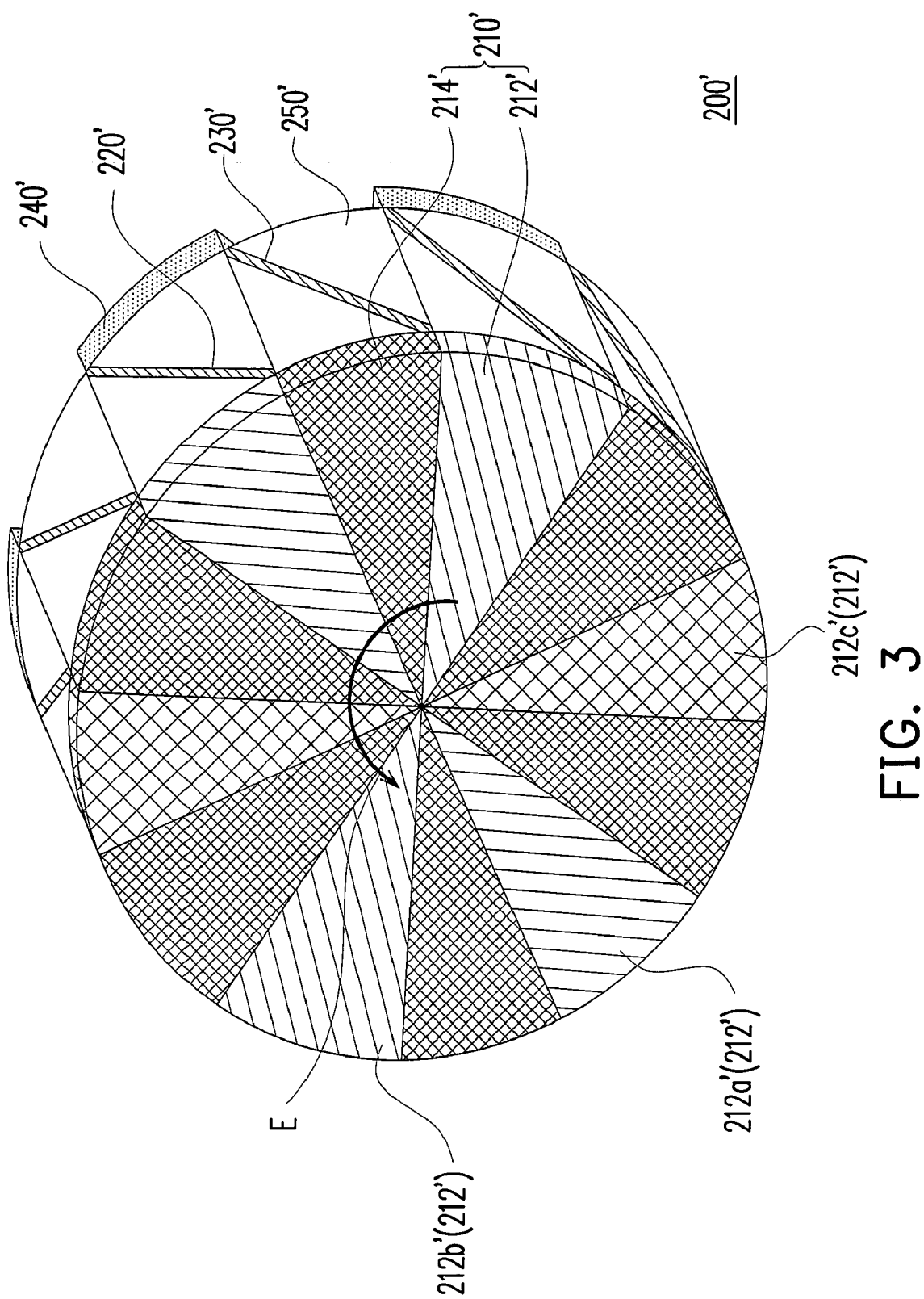
FIG. 3 is a perspective view of a color filtering device according to another embodiment of the present invention.
Figure 5:
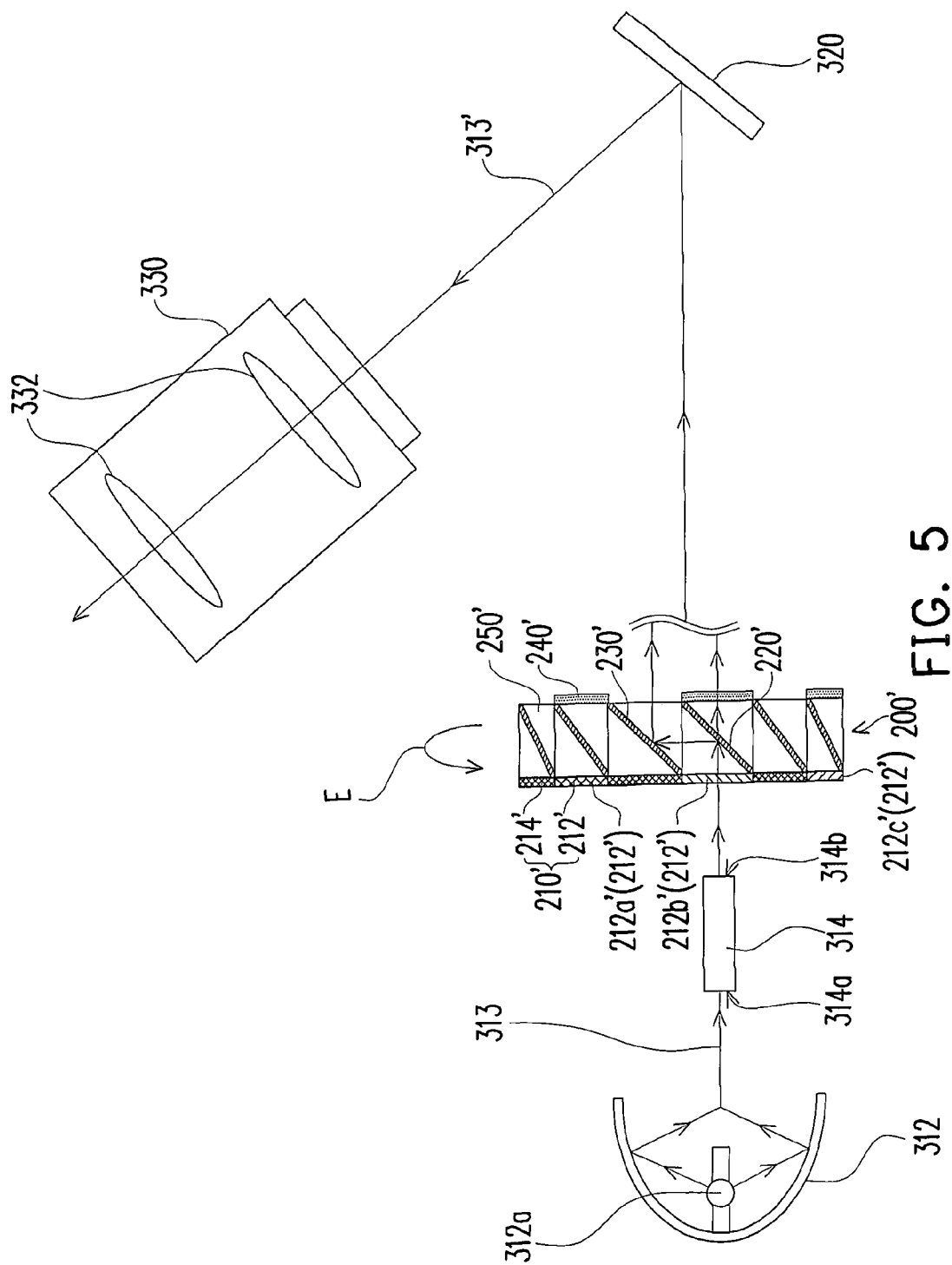
FIG. 5 is a schematic structural view of a projection apparatus according to another embodiment of the present invention.

Referring to FIG. 5, a projection apparatus 300' according to another embodiment of the present invention is similar to the projection apparatus 300 (referring to FIG. 4) of the above embodiment, except for the differences described as follows. The projection apparatus 300' adopts the above color filtering device 200' (referring to FIG. 3). Referring to FIGS. 3 and 5 together, in this embodiment, the color filtering device 200' is, for example, connected to a motor (not shown). The motor drives the color filtering device 200' to rotate in a rotation direction E, such that the filtering parts 212a', 212b' and 212c' face the light output end 314b in turn. In this way, the projection apparatus 300' of this embodiment has the similar functions as those of the projection apparatus 300. However, the color filtering device 200' of the present invention is not limited to rotate in the rotation direction E. In other embodiments, the color filtering device may also rotate in an inverse direction of the rotation direction E.

In view of above, as the color filtering device of the present invention integrates the color filter, the polarization beam splitting units, the reflecting units and the wave plates, the color filtering device of the present invention has both color filtering function and polarization conversion function. Therefore, the color filtering device of the present invention replaces the color wheel and the polarization conversion unit in the conventional projection apparatus. That is, one element in the present invention replaces two elements in the conventional art. Thus, the optical path of the projection apparatus using the color filtering device is reduced, thereby reducing the volume of the projection apparatus.

Additionally, in the projection apparatus of the present invention, as the color filtering device is capable of being moved or rotated to allow one of the filtering parts to face the light output end of the light integration rod in turn, the proportion of the illumination beam passing through the color filtering device is greatly increased. In this way, the brightness of the display image projected by the projection apparatus is effectively improved. Additionally, the cross-sectional area of the light output end can be designed to be smaller than or equal to the area of each filtering part to increase the proportion of the illumination beam passing through the filtering parts facing the light integration rod. In this manner, the light utilization efficiency of the projection apparatus of the present invention is greatly improved, and the brightness of the display image does not be easily influenced by the assembly error of the projection apparatus.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A color filtering device, comprising:
    a color filter, having a plurality of filtering parts and a plurality of light shielding parts alternately arranged thereon, wherein colors of the filtering parts comprise red, green, and blue;
    a plurality of polarization beam splitting units, respectively disposed in front of the filtering parts, each of the polarization beam splitting units making an angle with a corresponding filtering part;
    a plurality of reflecting units, respectively disposed in front of the light shielding parts, each of the reflecting units making an angle with a corresponding light shielding part; and
    a plurality of wave plates, substantially parallel to the filtering parts respectively, each of the polarization beam splitting units being disposed between a pair of a corresponding wave plate and a corresponding filtering part.

2. The color filtering device as claimed in claim 1, further comprising a plurality of transparent bodies disposed in front of the filtering parts and the light shielding parts, wherein a coating is disposed at a juncture of every two transparent bodies to form the polarization beam splitting units or the reflecting units.

3. The color filtering device as claimed in claim 1, wherein the polarization beam splitting units are substantially parallel to the reflecting units.

4. The color filtering device as claimed in claim 1, wherein the angle between each of the polarization beam splitting units and the corresponding filtering part falls within 0°-90°.

5. The color filtering device as claimed in claim 1, wherein the wave plates are half-wave plates.

6. The color filtering device as claimed in claim 1, wherein the color filter is rectangular-shaped, and each of the filtering parts and each of the light shielding parts are substantially rectangular-shaped.

7. The color filtering device as claimed in claim 1, wherein the color filter is round, and each of the filtering parts and each of the light shielding parts are substantially sector-shaped.

8. The color filtering device as claimed in claim 1, wherein two neighboring filtering parts have different colors.

9. A color filtering device, suitable for being used in a projection apparatus, the projection apparatus comprising a lamp module, a light integration rod, and a light valve, the lamp module being capable of providing an illumination beam, the light integration rod being disposed on a transmission path of the illumination beam and having a light input end and a light output end, and the light valve being disposed on a transmission path of the illumination beam and being capable of converting the illumination beam into an image beam, the color filtering device comprising:
   a color filter, having a plurality of filtering parts and a plurality of light shielding parts alternately arranged thereon, the color filter being disposed on the transmission path of the illumination beam and between the light integration rod and the light valve, and the color filter being capable of being moved or rotated, so as to make each of the filtering parts face the light output end of the light integration rod in turn;
   a plurality of polarization beam splitting units, respectively disposed in front of the filtering parts, each of the polarization beam splitting units making an angle with a corresponding filtering part; and
   a plurality of reflecting units, respectively disposed in front of the light shielding parts, each of the reflecting units making an angle with a corresponding light shielding part;
   a plurality of wave plates, substantially parallel to the filtering parts respectively, each of the polarization beam splitting units being disposed between a pair of a corresponding wave plate and a corresponding filtering part.

10. The color filtering device as claimed in claim 9, wherein an area of each filtering part is larger than or equal to a cross-sectional area of the light output end of the light integration rod.

11. The color filtering device as claimed in claim 9, further comprising a plurality of transparent bodies disposed in front of the filtering parts and the light shielding parts, wherein a coating is disposed at a juncture of every two transparent bodies to form the polarization beam splitting units or the reflecting units.

12. The color filtering device as claimed in claim 9, wherein the polarization beam splitting units are substantially parallel to the reflecting units.

13. The color filtering device as claimed in claim 9, wherein the angle between each of the polarization beam splitting units and the corresponding filtering part falls within 0°-90°.

14. The color filtering device as claimed in claim 9, wherein the wave plates are half-wave plates.

15. The color filtering device as claimed in claim 9, wherein the color filter is rectangular-shaped, and each of the filtering parts and each of the light shielding parts are substantially rectangular-shaped.

16. The color filtering device as claimed in claim 9, wherein the color filter is round, and each filtering part and each light shielding part are substantially sector-shaped.

17. The color filtering device as claimed in claim 9, wherein colors of the filtering parts comprise red, green, and blue.

18. The color filtering device as claimed in claim 9, wherein two neighboring filtering parts have different colors.

19. A color filtering device, comprising:
   a color filter, having a plurality of filtering parts and a plurality of light shielding parts alternately arranged thereon, wherein the color filter is round, and each of the filtering parts and each of the light shielding parts are substantially sector-shaped;
   a plurality of polarization beam splitting units, respectively disposed in front of the filtering parts, each of the polarization beam splitting units making an angle with a corresponding filtering part;
   a plurality of reflecting units, respectively disposed in front of the light shielding parts, each of the reflecting units making an angle with a corresponding light shielding part; and
   a plurality of wave plates, substantially parallel to the filtering parts respectively, each of the polarization beam splitting units being disposed between a pair of a corresponding wave plate and a corresponding filtering part.

* * * * *